US012331567B2

(12) United States Patent
Sobecki et al.

(10) Patent No.: US 12,331,567 B2
(45) Date of Patent: Jun. 17, 2025

(54) VEHICULAR FLUSH DOOR HANDLE ASSEMBLY WITH VARIABLE SPEED ACTUATOR

(71) Applicant: Magna Mirrors of America, Inc., Holland, MI (US)

(72) Inventors: Justin E. Sobecki, Rockford, MI (US); Connor G. Cervone, Byron Center, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 153 days.

(21) Appl. No.: 18/359,114

(22) Filed: Jul. 26, 2023

(65) Prior Publication Data

US 2024/0035318 A1 Feb. 1, 2024

Related U.S. Application Data

(60) Provisional application No. 63/369,781, filed on Jul. 29, 2022.

(51) Int. Cl.
*E05B 85/10* (2014.01)
*E05B 85/16* (2014.01)

(52) U.S. Cl.
CPC ............ *E05B 85/107* (2013.01); *E05B 85/16* (2013.01)

(58) Field of Classification Search
CPC ............................... E05B 85/107; E05B 85/16
See application file for complete search history.

(56) References Cited

U.S. PATENT DOCUMENTS

| | | | | |
|---|---|---|---|---|
| 3,528,695 A * | 9/1970 | Peters | E05B 85/14 292/336.3 |
| 5,123,687 A | 6/1992 | Pfeiffer et al. | |
| 5,671,996 A | 9/1997 | Bos et al. | |
| 5,706,554 A * | 1/1998 | Ruckert | E05B 85/16 292/336.3 |
| 5,725,262 A * | 3/1998 | Kritzler | E05B 83/36 292/DIG. 31 |
| 5,786,772 A | 7/1998 | Schofield et al. | |
| 5,929,786 A | 7/1999 | Schofield et al. | |
| 5,938,321 A | 8/1999 | Bos et al. | |
| 6,139,172 A | 10/2000 | Bos et al. | |
| 6,152,590 A | 11/2000 | Furst et al. | |
| 6,198,409 B1 | 3/2001 | Schofield et al. | |
| 6,227,689 B1 | 5/2001 | Miller | |
| 6,229,233 B1 | 5/2001 | Torii et al. | |

(Continued)

*Primary Examiner* — Mark A Williams
(74) *Attorney, Agent, or Firm* — HONIGMAN LLP

(57) ABSTRACT

A vehicular exterior door handle assembly includes a base portion configured to mount at a door of a vehicle, and a handle portion. The base portion has a longitudinal axis that extends along a length dimension of the base portion and a lateral axis that extends laterally across the vehicle. The handle portion is movable along the lateral axis relative to the base portion between a recessed position and a deployed position. An actuator, when operated, imparts translational movement of a sliding element along the longitudinal axis relative to the base portion. As the sliding element moves along the longitudinal axis relative to the base portion, the sliding element imparts movement of the handle portion along the lateral axis between the recessed position and the deployed position according to movement of the sliding element along the longitudinal axis.

35 Claims, 13 Drawing Sheets

(56) References Cited

U.S. PATENT DOCUMENTS

| | | | |
|---|---|---|---|
| 6,259,175 B1 | 7/2001 | Alfano et al. | |
| 6,291,905 B1 | 9/2001 | Drummond et al. | |
| 6,349,450 B1 | 2/2002 | Koops et al. | |
| 6,390,264 B2 | 5/2002 | Torii et al. | |
| 6,396,408 B2 | 5/2002 | Drummond et al. | |
| 6,477,464 B2 | 11/2002 | McCarthy et al. | |
| 6,550,103 B2 | 4/2003 | Koops et al. | |
| 6,582,109 B2 | 6/2003 | Miller | |
| 6,879,065 B2 | 4/2005 | Corbett, Jr. et al. | |
| 6,907,643 B2 | 6/2005 | Koops et al. | |
| 6,977,619 B2 | 12/2005 | March et al. | |
| 7,407,203 B2 | 8/2008 | Huizenga et al. | |
| 7,421,922 B2 | 9/2008 | Hamann et al. | |
| 7,492,281 B2 | 2/2009 | Lynam et al. | |
| 7,581,859 B2 | 9/2009 | Lynam | |
| 7,626,749 B2 | 12/2009 | Baur et al. | |
| 7,944,371 B2 | 5/2011 | Foote et al. | |
| 8,058,977 B2 | 11/2011 | Lynam | |
| 8,333,492 B2 | 12/2012 | Dingman et al. | |
| 8,786,401 B2 | 7/2014 | Sobecki et al. | |
| 8,786,704 B2 | 7/2014 | Foote et al. | |
| 9,605,452 B2 | 3/2017 | Yoshino et al. | |
| 10,550,611 B2 | 2/2020 | Och | |
| 10,759,290 B2 | 9/2020 | Sha | |
| 11,536,058 B2 | 12/2022 | Han et al. | |
| 11,549,288 B2 | 1/2023 | Grenouillat et al. | |
| 11,578,514 B2 | 2/2023 | Han et al. | |
| 11,639,619 B2 * | 5/2023 | Han | E05B 77/06 292/336.3 |
| 11,643,856 B2 * | 5/2023 | Jeong | E05B 85/107 292/336.3 |
| 11,680,432 B2 | 6/2023 | Sobecki | |
| 2002/0047279 A1 * | 4/2002 | Byrla | B60Q 3/267 292/336.3 |
| 2004/0222649 A1 * | 11/2004 | Ito | E05B 85/14 292/336.3 |
| 2010/0007463 A1 | 1/2010 | Dingman et al. | |
| 2011/0148575 A1 | 6/2011 | Sobecki et al. | |
| 2013/0079984 A1 * | 3/2013 | Aerts | G07C 9/00944 292/336.3 |
| 2014/0000167 A1 * | 1/2014 | Patel | E05B 85/103 49/32 |
| 2016/0084360 A1 | 3/2016 | Foucaut et al. | |
| 2016/0298366 A1 | 10/2016 | Och | |
| 2018/0106082 A1 | 4/2018 | Brown et al. | |
| 2020/0102773 A1 * | 4/2020 | Sobecki | E05B 85/107 |
| 2022/0018168 A1 | 1/2022 | Cervone et al. | |
| 2022/0074244 A1 * | 3/2022 | Han | E05B 79/06 |
| 2022/0205289 A1 * | 6/2022 | Song | E05B 81/00 |
| 2022/0282534 A1 * | 9/2022 | Peterson | E05B 81/64 |
| 2022/0341226 A1 | 10/2022 | Sobecki et al. | |

* cited by examiner

VEHICULAR FLUSH DOOR HANDLE ASSEMBLY WITH VARIABLE SPEED ACTUATOR

CROSS REFERENCE TO RELATED APPLICATION

The present application claims the filing benefits of U.S. provisional application Ser. No. 63/369,781, filed Jul. 29, 2022, which is hereby incorporated herein by reference in its entirety.

FIELD OF THE INVENTION

The present invention relates to handles for vehicles and, more particularly, to an exterior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

An extendable flush door handle assembly for opening a door of a vehicle (such as a side door or rear door or liftgate of a vehicle) includes a handle portion that is disposed at the door such that, when not in use to open the vehicle door, the handle portion is recessed at the door, with the outer surface of the handle portion generally flush with or generally coplanar with (or only slightly protruding from or slightly recessed in) the outer surface of the door panel at the door handle region of the door. The door handle assembly is operable to extend or move or pivot the handle portion outward from the door panel when a user is to use the handle to open the vehicle door, such as in response to a signal from a key fob or a passive entry system or the like. When so extended or moved to a deployed position, the handle may be readily grasped by the user and actuated or pulled or moved further outward to open the vehicle door. After the user releases the handle, the handle may return to its non-use or partially recessed position where its outer surface is generally flush or coplanar with (or only slightly protruding from of recessed in) the outer surface of the door panel.

For example, the vehicular door handle assembly may include a base portion configured to mount at a door of a vehicle and an actuator including an electrically operable motor that is electrically operable in response to an input signal. The actuator includes an output element mechanically coupled to the handle portion and may include a drive element coupled between the motor and the output element. When the motor is electrically operated, the actuator imparts movement of the output element to move the handle portion between the recessed position and the deployed position. The handle portion may move along a lateral axis relative to the base portion when deployed (i.e., the handle portion, with the door handle assembly at a door of a vehicle, moves laterally relative to the vehicle or moves generally perpendicular to a longitudinal axis of the vehicle). The output element translationally moves along a longitudinal axis of the handle or vehicle. As the output element moves along the longitudinal axis, the output element imparts movement of a sliding element along the longitudinal axis relative to the base portion. The sliding element is fixed along the lateral axis relative to the base portion. As the sliding element moves along the longitudinal axis relative to the base portion, the handle portion moves along the lateral axis between the recessed position and the deployed position according to movement of the sliding element along the longitudinal axis.

Optionally, the drive element may be a variable speed drive element and, when the motor is electrically operated to move the handle portion from the recessed position, the variable speed drive element may move the output element at a first speed toward a partially deployed position of the door handle. When the motor is electrically operated to further deploy the handle from the partially deployed position, the variable speed drive element moves the output element at a second speed that is faster than the first speed to more rapidly move the handle portion from the partially deployed state toward the deployed position of the door handle.

These and other objects, advantages, purposes and features of the present invention will become apparent upon review of the following specification in conjunction with the drawings.

DESCRIPTION OF THE PREFERRED EMBODIMENTS

Figure 1:
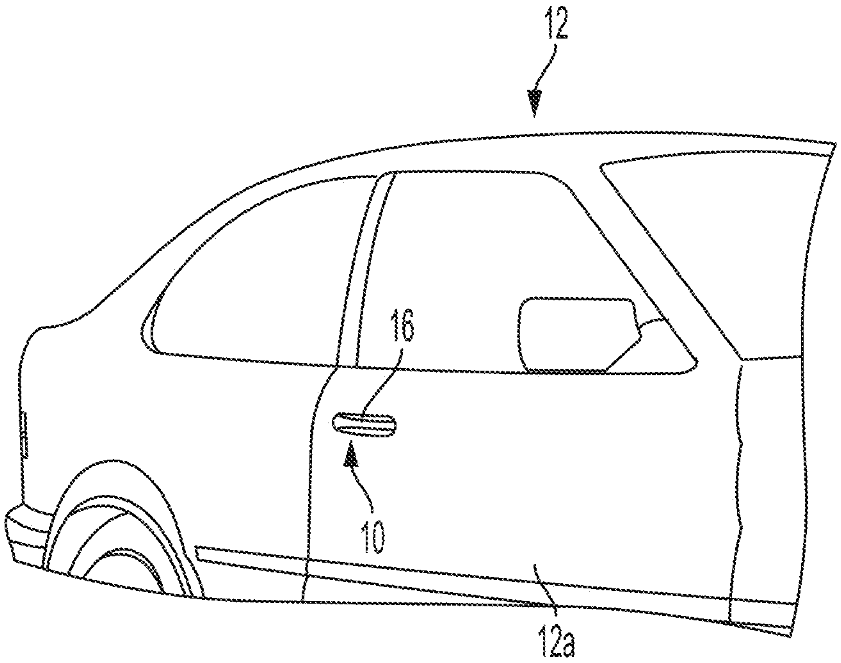
FIG. 1 is a perspective view of a vehicle with an extendable flush door handle assembly.
Figure 2:
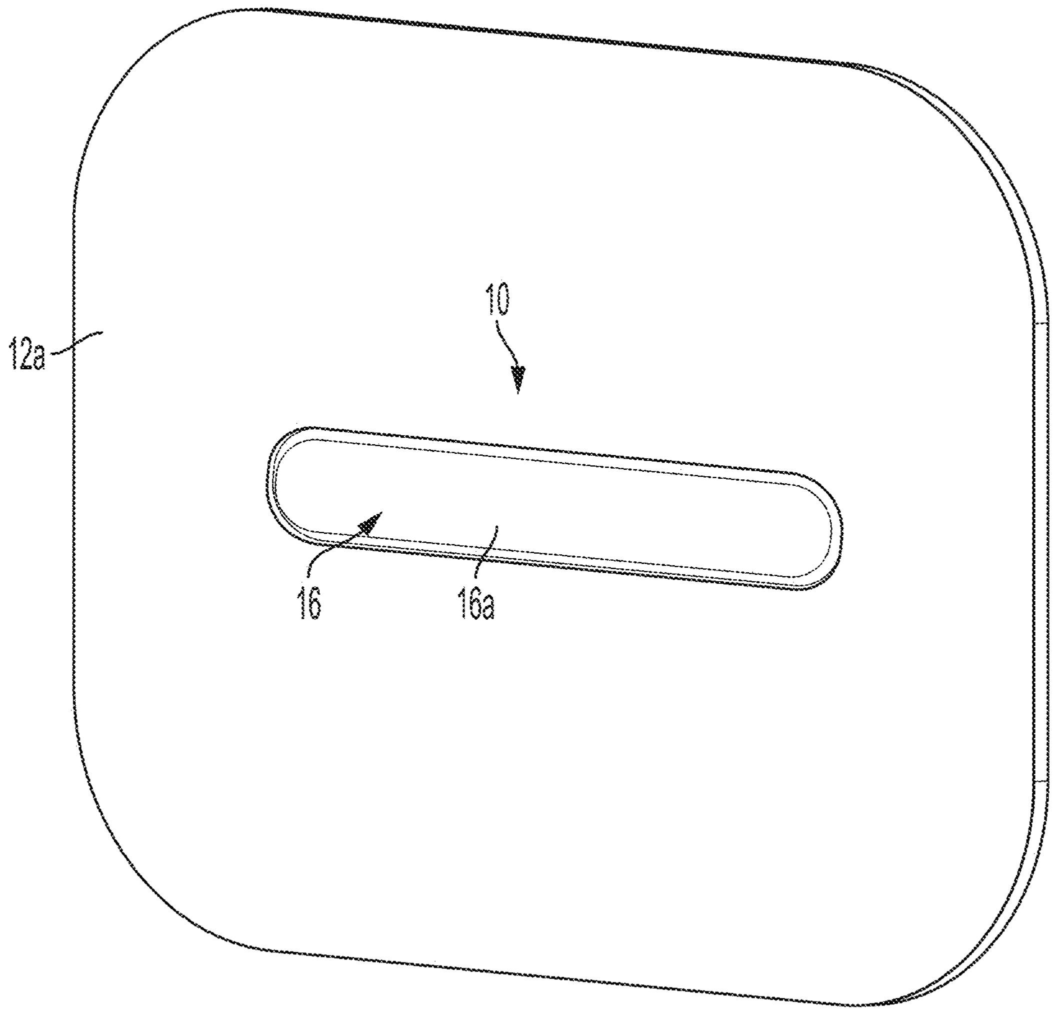
FIG. 2 is an enlarged perspective view of the extendable flush door handle assembly of FIG. 1 at the vehicle door, with the door handle in its flush or non-use or recessed position.
Figure 3:
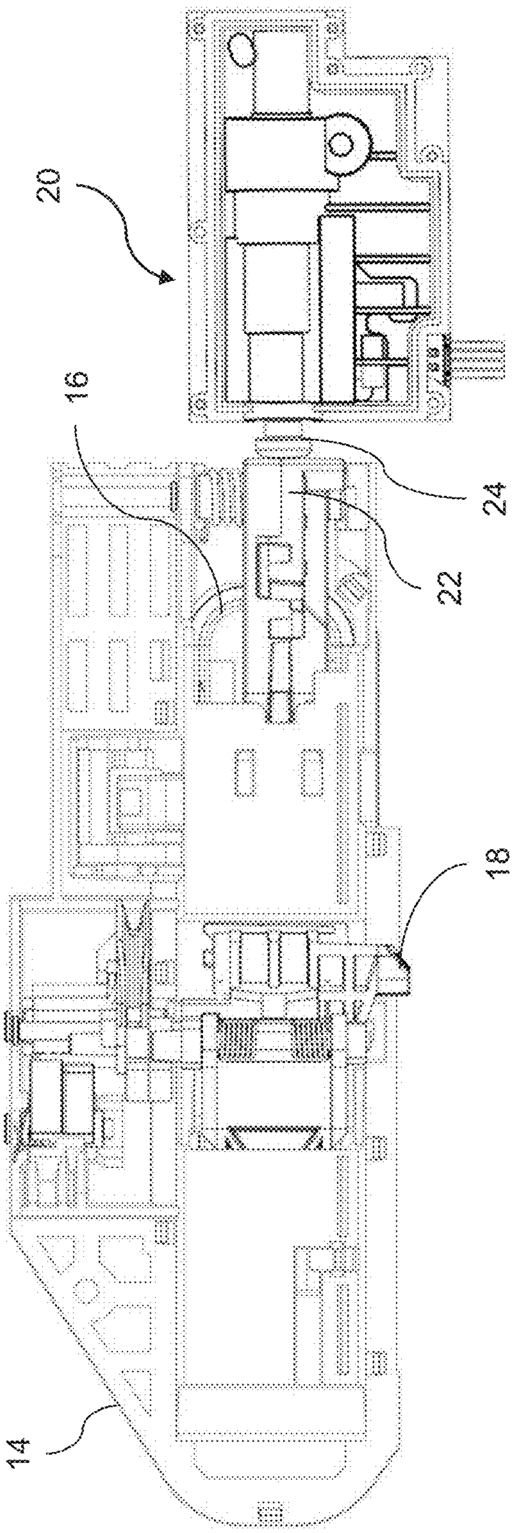
FIG. 3 is a perspective view of the extendable flush door handle assembly with a variable speed actuator configured to move the handle portion between the recessed position and an extended position, where the handle portion pivots relative to a base portion when moved between the recessed position and the extended position.

Referring now to the drawings and the illustrative embodiments depicted therein, a vehicular handle assembly or module or unit or extendable flush door handle assembly 10 is mountable to a door 12*a* of a vehicle 12 and operable to release a latch mechanism of the vehicle door 12*a* to open the vehicle door (FIGS. 1 and 2). The vehicular handle assembly 10 includes a base portion or bracket 14 that is mountable to the vehicle door 12*a* and a handle or strap portion 16 that is pivotally mounted to the bracket 14 (FIG. 3). When not in use, the handle portion 16 is at an initial rest or recessed or non-use position and is received or disposed at or partially in the base portion 14 so that an outer surface 16*a* of the handle portion 16 is generally flush with or generally coplanar with (or protruding only slightly from or recessed slightly in) the outer surface 14*a* of the base portion 14 or the door panel 12*a*, whereby the handle portion 16 is not readily usable or graspable by a user (FIG. 2). The handle portion 16 is electromechanically pivotable or movable or laterally movable relative to the door and the base portion 14 to move to its extended or ready or operational or grippable or graspable or person-operable position and is then graspable or grippable by a user where the handle portion 16 may be manually moved (such as via pulling by the user) further beyond the extended position to actuate a bellcrank 18 at the base portion 14, which in turn actuates or releases the latch mechanism of the door to open the vehicle door. The handle assembly 10 includes an electrically operable or electromechanical actuator 20 at the base portion 14 for imparting the pivotal movement of the handle portion 16 relative to the base portion 14 (such as automatically imparting such handle movement in response to a signal from a key fob or a passive entry system or the like) so that the handle portion 16 is automatically moved from its recessed position to its ready or graspable position where a user can grasp the handle portion to pull or move the handle portion for unlatching and/or opening the vehicle door and/or the like.

The handle assembly 10 may comprise any suitable type of handle assembly, and may include or incorporate aspects of the door handle assemblies described in U.S. Pat. Nos. 8,786,401; 6,977,619; 7,407,203 and/or 8,333,492, and/or U.S. Publication Nos. US-2022-0341226; US-2022-0282534; US-2022-0018168 and/or US-2020/0102773, which are all hereby incorporated herein by reference in their entireties. Optionally, aspects of the handle assembly 10 and/or the actuator 20 may be suitable for use with a liftgate handle assembly for a liftgate or tailgate of a vehicle. The actuator comprises a variable torque/variable speed actuator and may utilize aspects of the actuators described in U.S. Publication Nos. US-2022-0341226 and/or US-2022-0282534, which are all hereby incorporated herein by reference in their entireties. Although shown and described as a variable torque/variable speed actuator for pivoting the door handle, the actuator and handle mechanism may be configured to cause lateral or non-pivoting movement of the door handle relative to the base portion.

As shown in FIG. 3, the handle or strap portion 16 may be disposed at the base portion 14 and includes a grasping portion for a user to grab and pull at when the handle portion 16 is moved to its graspable position to open the vehicle door 12*a*. An actuator engaging portion or element 22 is pivotally mounted at the bracket 14 and, when pivoted relative to the bracket 14, moves the handle portion 16 between the recessed and graspable positions. The actuator engaging element 22 is moved or pivoted relative to the bracket 14 via extension of a plunger or actuating member 24 of the actuator 20. That is, with the handle portion 16 in the recessed position, the plunger 24 of the actuator 20 is retracted or compressed or contracted toward the actuator 20. When the actuator 20 is electrically operated to move the handle portion 16 from the recessed position to the graspable position, the actuator 20 extends the plunger 24 that engages the actuator engaging element 22 to move or pivot the actuator engaging element 22 and move the handle portion 16 from the recessed position toward the extended position. When the actuator 20 retracts the plunger 24, the handle portion 16 and actuator engaging element 22 are biased toward the recessed position (such as via a spring or biasing element) and retraction of the plunger 24 allows the handle portion 16 to return to the recessed position. Thus, the actuator 20 operates to extend and retract the plunger 24 to impart movement of the handle portion 16 between the recessed and graspable positions.

Referring to FIGS. 4-8, the actuator 20 may operate to initially slowly extend the plunger 24 (at higher torque or force), and then more rapidly extend the plunger 24 (at lower torque or force) to provide a variable speed (and torque/force) plunger, as discussed below (and such as described in U.S. Publication No. US-2022-0341226, incorporated above). The actuator 20 thus may provide an initial higher torque output to break the handle free in situations where the handle portion 16 is frozen or otherwise has ice or other elements (beyond the spring force that is applied to the handle to hold the handle in the recessed position) blocking or inhibiting extension of the handle portion 16 toward the deployed position.

The actuator 20 includes a housing 26 (that may include a first housing portion and a second housing portion that join together to form a housing cavity) that houses or accommodates an electrically operated motor 28 and a gear train. When the motor 28 is electrically operated, it rotates gears of the gear train to impart movement of the plunger 24. In the illustrated example, the motor 28 rotatably drives a worm gear 28*a* that engages with and drives a helical cluster gear 30 that is rotatably mounted at the housing via a pin or axle 30*a*. The helical cluster gear 30 includes a gear element that engages a spur gear 32, which is rotated when the motor is operated. The plunger 24 is movably coupled to the spur gear 32 via a variable lead screw 34, which is rotated at different speeds depending on its degree of extension relative to the spur gear 32. The plunger 24 includes one or more tabs or elements or wings 24*a* that are received in respective channels of the housing 26 to limit or preclude rotation of the plunger as it is translationally moved via rotation of the variable lead screw 34 when the motor is operated. Optionally, the gear train rotatably connecting the motor 28 and the variable lead screw 34 responsible for translational movement of the plunger 24 may comprise any number of gears. For example, the worm gear 28*a* of the motor 28 may directly engage a gear element of the spur gear 32. Thus, when the motor 28 is electrically operated to extend the plunger 24 relative to the actuator housing 26, the motor 28 drives the gear train to impart rotation of the variable lead screw 34. Because the plunger 24 is rotationally fixed relative to the actuator housing 26 and thus does not rotate as the variable lead screw 34 is rotatably driven, the plunger 24 translates along the variable lead screw 34 according to rotation of the variable lead screw 34.

The variable lead screw 34 includes a finer pitch gear end or portion 34*a* (that is rotatably received in an internal gear passageway of the spur gear 32) and a coarser pitch gear end or portion 34*b* (that is rotatably received in an internal gear passageway 24*b* of the plunger 24), with a central portion 34*c* extending between the finer gear portion 34*a* and the coarser gear portion 34*b*. A flange or cap 36 is disposed at the distal end of the finer pitch gear portion 34*a* distal from the central portion 34*c*, and a collar or ring 38 (optionally, with a wrap spring) is disposed at the spur gear 32 and is engaged with a protruding part of the spur gear 32 and is disposed around the central portion 34*c* of the variable lead screw when the lead screw 34 and plunger 24 are in the retracted state. The finer pitch gear portion 34*a* of the variable lead screw 34 passes through the internal gear of the spur gear 32, with the cap 36 attached at the distal end of the lead screw 34 at a first side 32*a* of the spur gear 32, and with the collar or ring 38 disposed at the central portion 34*c* at a second side 32*b* of the spur gear 32 opposite the first side 32*a* and facing the plunger 24. The protruding part of the spur gear 32 at which the collar 38 is engaged circumscribes the opening of the internal gear and protrudes from the second side 32*b* of the spur gear 32 towards the plunger 24.

In other words, the spur gear 32 includes the internal gear passageway and a portion of the variable lead screw 34 extends through the spur gear 32 such that the finer pitch gear portion 34*a* of the lead screw 34 is received by and engages the internal gear passageway. The cap 36 is disposed at the distal end of the finer pitch gear portion 34*a* of the lead screw 34 with the first side 32*a* of the spur gear 32 facing the cap 36. At least a portion of the central portion 34*c* of the lead screw 34 extends from the second side 32*b* of the spur gear 32, with the collar 38 and the wrap spring disposed at the central portion 34*c* at the second side 32*b*. The coarser pitch gear portion 34*b* of the lead screw 34 extends from the central portion 34*c* and away from the second side 32*b* of the spur gear 32 and is at least partially received along the internal gear passageway 24*b* of the plunger 24.

Figure 4:
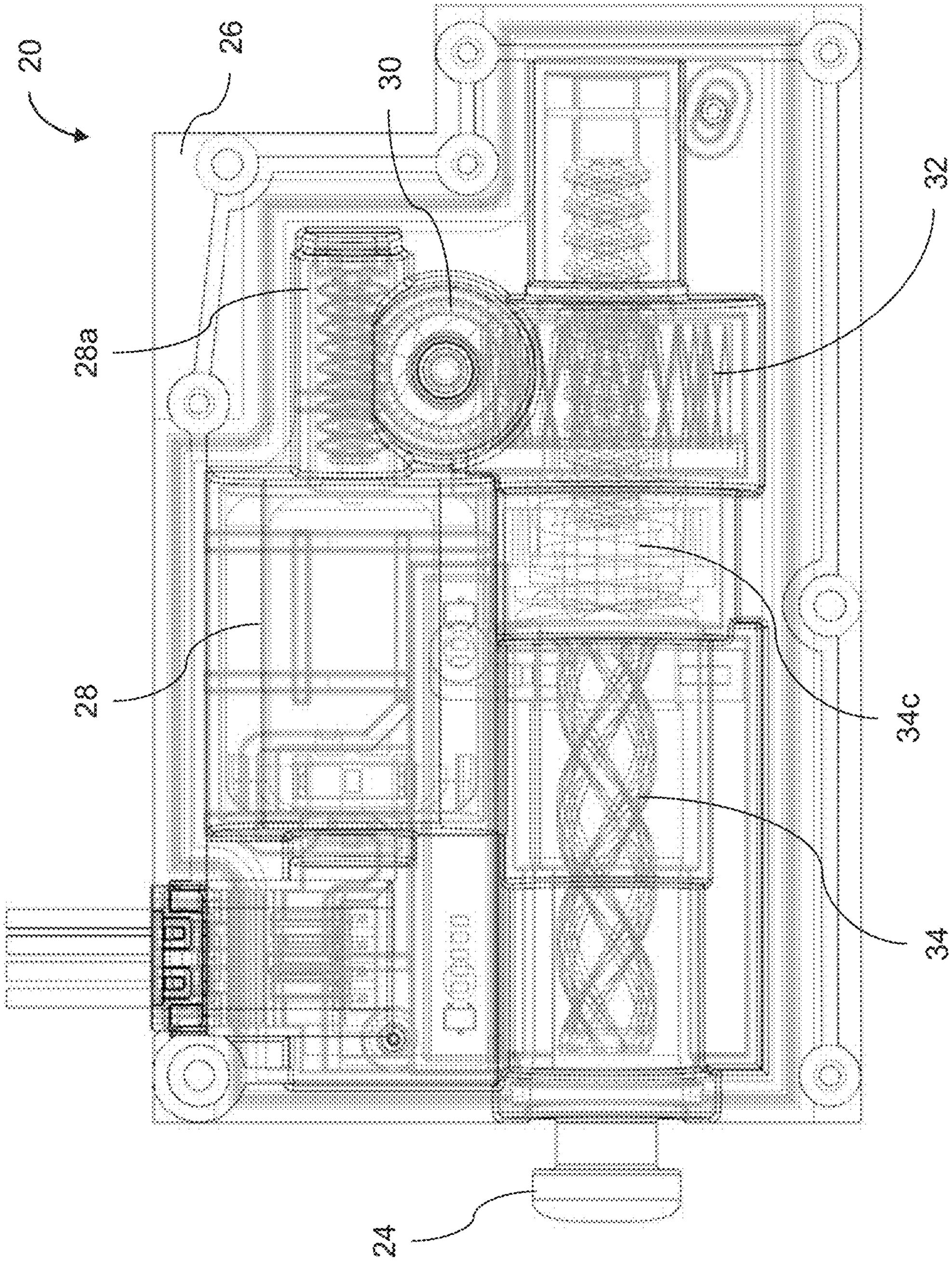
FIGS. 4 and 5 are plan views of the variable speed actuator with a plunger of the actuator in a retracted position.
Figure 5:
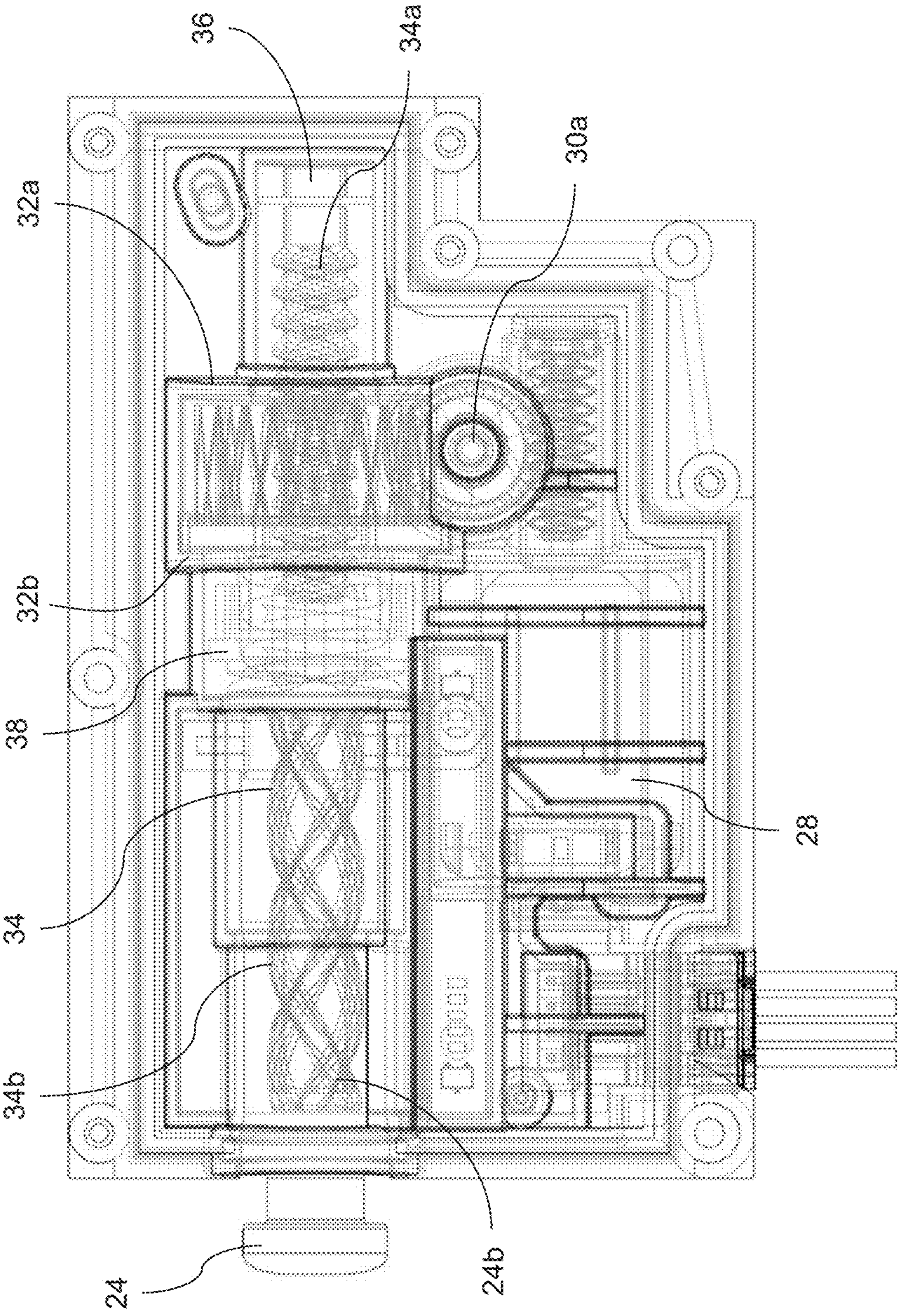

Thus, and such as shown in FIGS. 4 and 5, when the actuator 20 is retracted (and the handle portion 16 is in the flush state), the lead screw 34 is positioned or retracted so that the central portion 34*c* of the lead screw is at the second side 32*b* of the spur gear 32 and at least partially within or circumscribed by the collar 38, and so that the distal end (and cap 36) of the finer pitch gear 34*a* is spaced from the first side 32*a* of the spur gear 32 and the coarser pitch gear 34*b* is at least partially disposed within the internal passageway 24*b* of the plunger 24 (i.e., the plunger 24 is retracted along the coarser pitch gear 34*b*). The collar 38 and spring are retained within a channel of the housing 26 so that the collar 38 and spring are at and against the second side 32*b* of the spur gear 32 and do not axially move (in a direction along a longitudinal axis of the plunger 24) during operation of the actuator 20.

When the actuator 20 is initially operated to begin deploying the handle portion 16 from the flush state, the spur gear 32 is rotated (via operation of the motor 28 and rotation of the gears 28*a* and 30), which causes the lead screw 34 to move longitudinally outward in a direction away from the second side 32*b* of the spur gear 32, with rotation and movement of the lead screw 34 limited or inhibited via the collar 38 and spring. In other words, as the spur gear 32 is rotated, rotation of the lead screw 34 relative to the spur gear 32 is at least initially limited or precluded by the biasing force of the collar 38 and spring so that the lead screw 34 moves longitudinally relative to the spur gear 32 via engagement of the finer pitch gear portion 34*a* with the internal gear of the spur gear 32. That is, with the handle portion 16 in the flush state and the plunger 24 in the retracted state relative to the actuator housing 26, operation of the actuator 20 causes the variable lead screw 34 to translate longitudinally outward from the actuator housing 26. Because rotation of the lead screw 34 relative to the spur gear 32 is initially limited, rotation of the spur gear 32 causes the spur gear 32 to travel along the finer pitch portion 34*a* of the lead screw 34, moving the lead screw 34 longitudinally relative to the spur gear 32.

Figure 6:
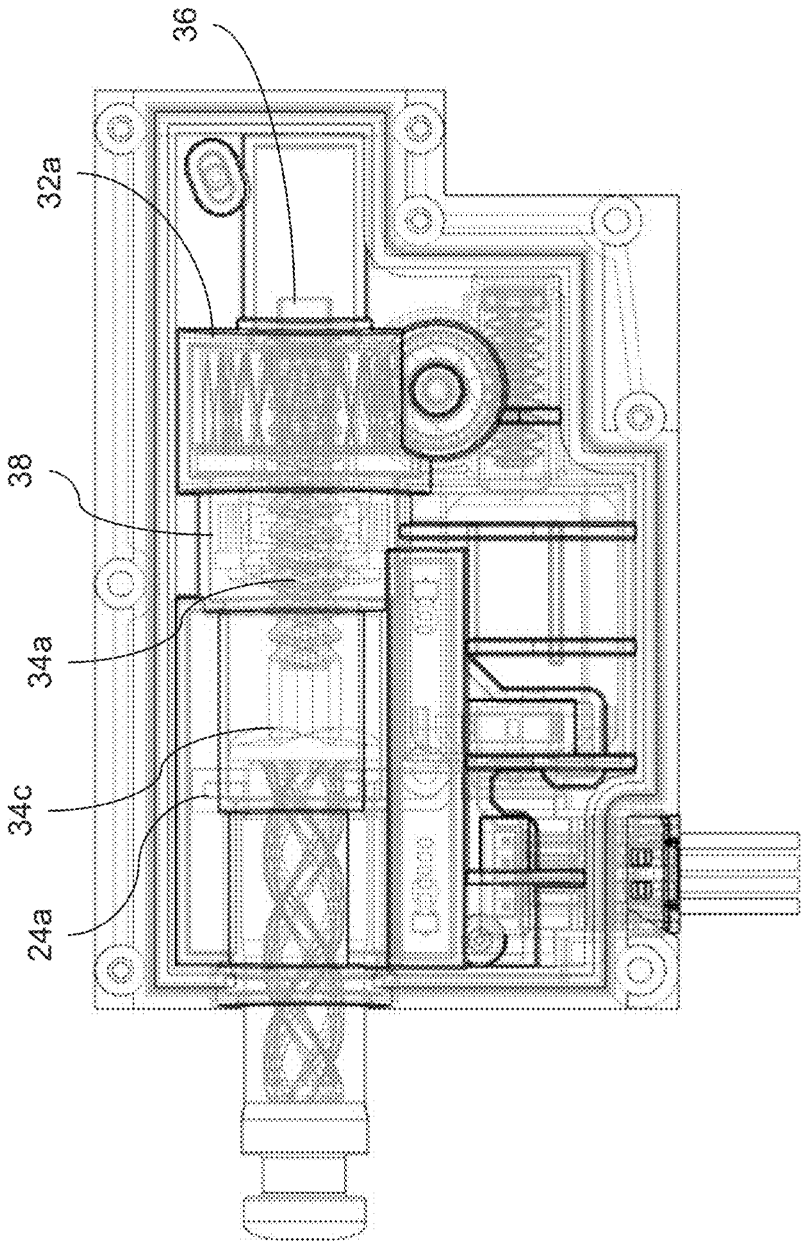
FIG. 6 is a plan view of the variable speed actuator with the plunger in a partially extended position.

Thus, and as shown in FIG. 6, the finer pitch gears (i.e., the finer pitch gear portion 34*a* and the internal gear of the spur gear 32) function to move the lead screw 34 (and plunger 24) to a first extended or partially extended position, which as the plunger 24 acts on the actuator engaging portion 22, moves the handle portion 16 partially outward. Because longitudinal movement of the lead screw 34 and plunger 24 is initially driven by the finer pitch gear portion 34*a* engaging the internal gear of the spur gear 32, this initial extension is achieved at a first, slower speed and a first, higher torque, and thus provides a greater pivoting force at the handle portion 16 that can break the handle portion free of ice or the like that may otherwise inhibit the initial deployment of the handle portion. As the lead screw 34 moves outward, the central portion 34*c* moves outward of the collar 38 (which is held stationary within the channel of the housing 26) and the cap 36 moves toward and into engagement with the first side 32*a* of the spur gear 32 at the partially extended position.

Figure 7:
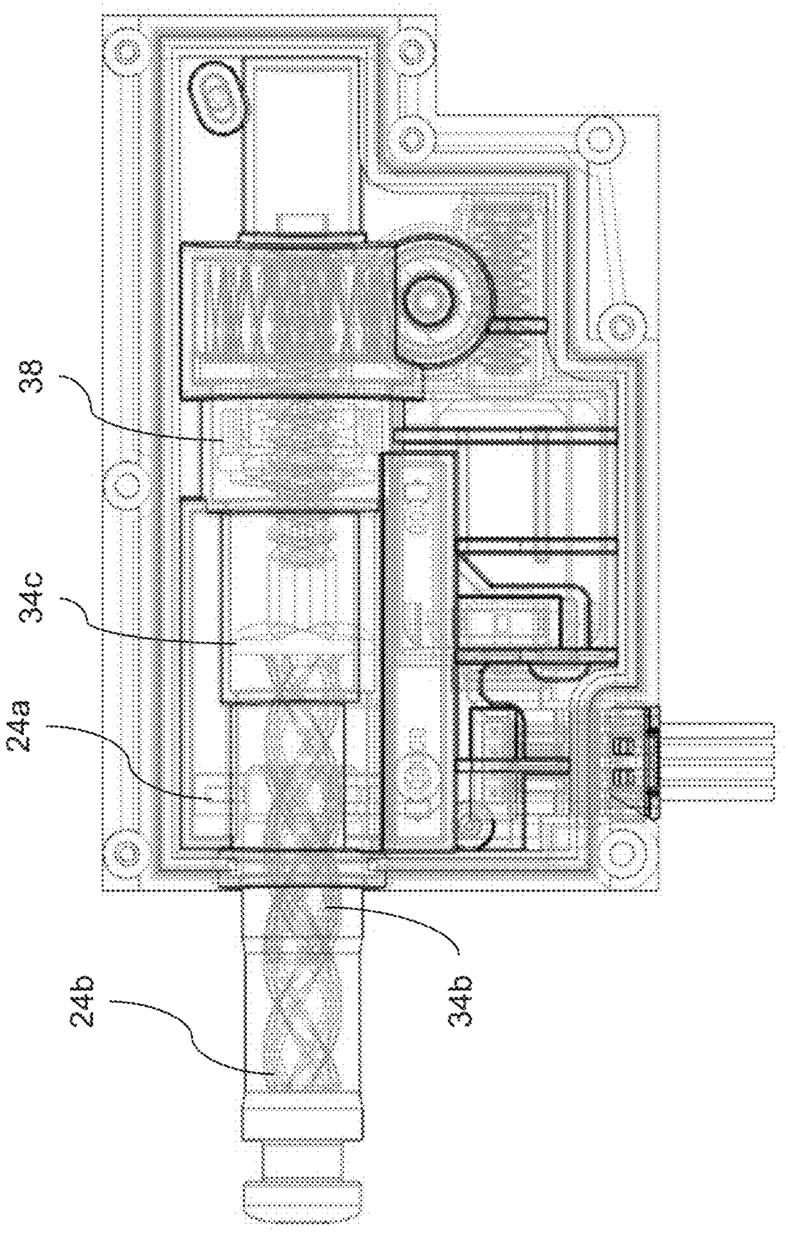
FIG. 7 is a plan view of the variable speed actuator with the plunger in a fully extended position.

As shown in FIGS. 6 and 7, when the actuator 20 is in the partially extended position, further operation of the motor (and thus further rotation of the gears 28*a* and 30 and further rotation of the spur gear 32) causes the lead screw 34 to rotate according to rotation of the spur gear 32. This is because the central portion 34*c* is no longer clamped by the collar 38 and spring, which reduces or eliminates the biasing force limiting rotation of the lead screw 34. Further, the end cap 36 engaging the first side 32*a* of the spur gear 32 precludes further longitudinal movement of the lead screw 34 relative to the spur gear 32. With the wings 24*a* of the plunger 24 received along the channels of the housing 26 and preventing rotation of the plunger 24 relative to the housing 26, the lead screw 34 rotates within the internal gear or chamber 24*b* of the plunger 24, causing the plunger 24 to longitudinally move along the lead screw 34 and outward from the housing 26.

Rotation of the lead screw 34 causes more rapid extension of the plunger 24 due to the rotation of the coarser pitch gear 34*b* within the internal gear 24*b* of the non-rotatable plunger 24. In other words, the pitch of the coarser pitch gear 34*b* is greater than the pitch of the finer pitch gear 34*a* (i.e., there is a greater distance traveled between grooves). Thus, compared to the initial translation of the lead screw 34 caused by driving the finer pitch gears, the same rotational force from the motor 28 and spur gear 32 driving the coarser pitch gears results in less torque applied through the plunger 24 and the plunger extends more rapidly. That is, the extension of the plunger 24 from the partially extended state toward a fully extended state is achieved at a second speed (that is faster than the first speed) and a second torque (that is lower than the first torque). Thus, even though the motor revolutions per minute (RPM) may be the same, the rate of extension of the plunger 24 increases from the initial deployment (via longitudinal movement of the lead screw) to the later deployment (via rotation of the lead screw).

Movement of the handle portion 16 from the partially extended position to the fully extended position is thus driven at the faster second speed. Because movement of the handle portion 16 from the recessed position to the partially extended position is driven at the slower first speed and higher first torque to remove or break any ice buildup at the outer surface of the handle portion 16, the handle portion 16 may then be driven at the faster second speed to make the handle portion 16 more quickly available for grasping by the user.

Figure 8:
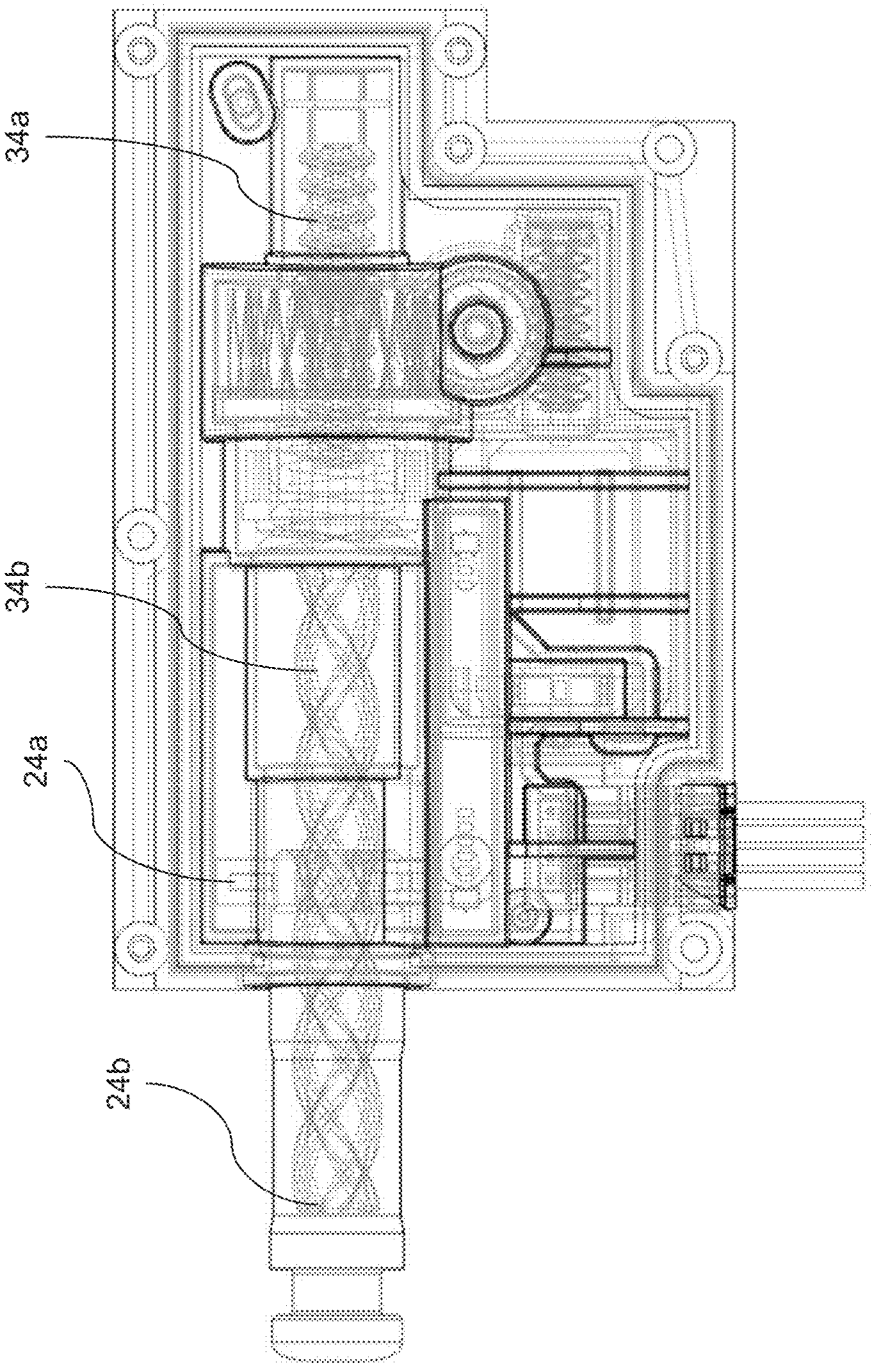
FIG. 8 is a plan view of the variable speed actuator with the plunger in another partially extended position.
Figure 9:
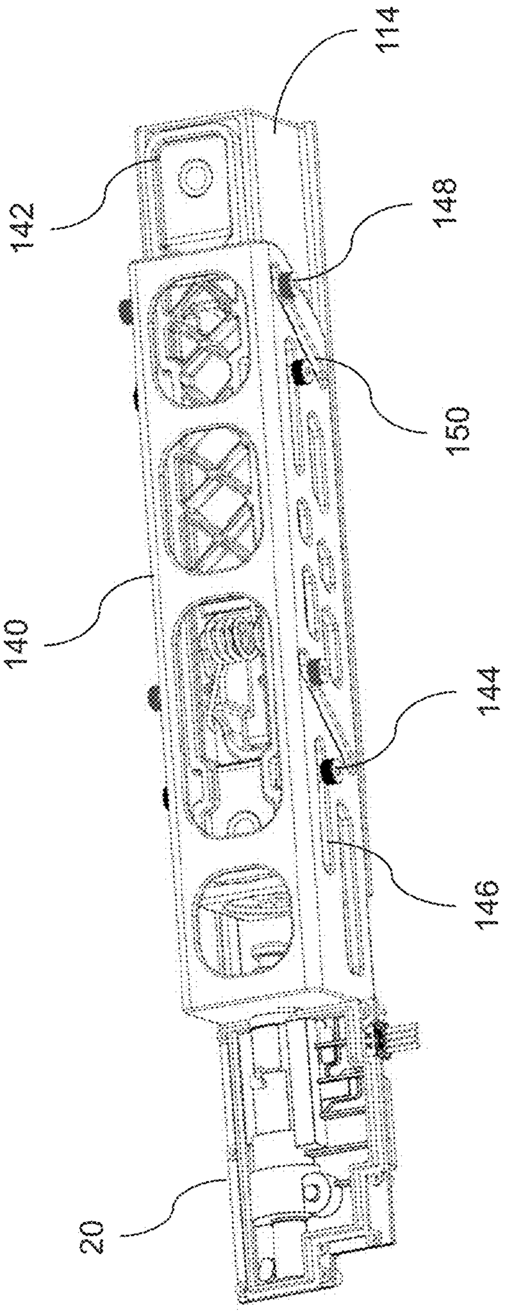
FIG. 9 is a perspective view of the variable speed actuator and an extendable flush door handle assembly where the handle portion moves laterally relative to the base portion when moved between the recessed position and the extended position.
Figure 10:
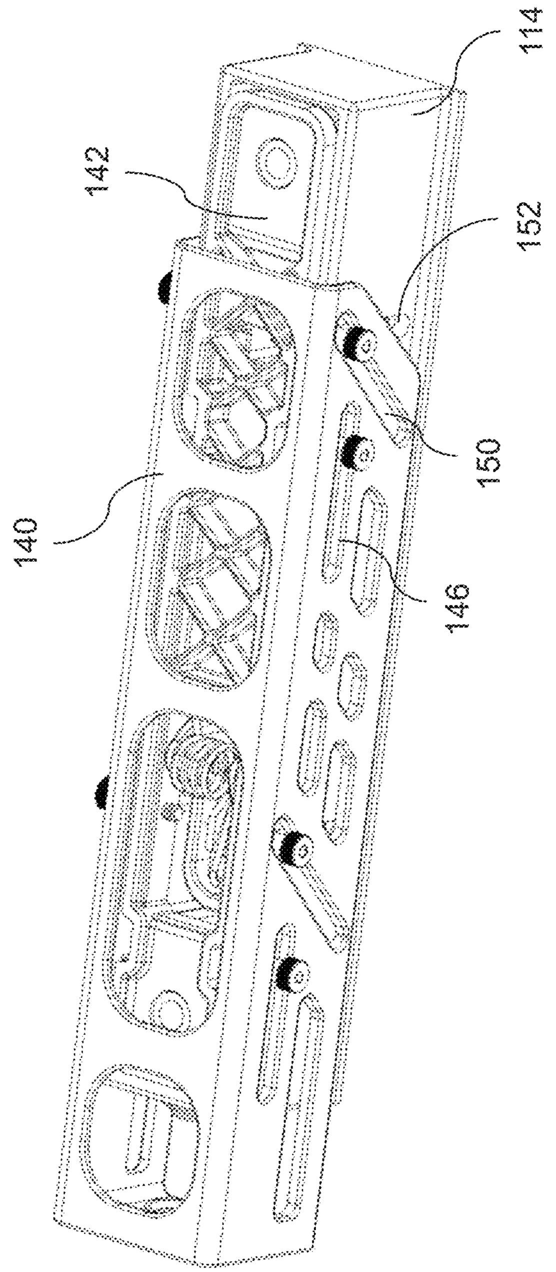
FIG. 10 is a perspective view of the handle portion of the door handle assembly of FIG. 9, where the handle portion is in the recessed position relative to the base portion.

Referring to FIG. 8, with the handle portion 16 and the plunger 24 in the recessed position, the actuator 20 may move the plunger 24 from the retracted position toward the deployed position where initial operation of the motor 28 results in the rotation of the lead screw 34 and therefore longitudinal movement of the plunger 24 along the lead screw 34 via rotation of the lead screw 34 within the pitched chamber 24*b* of the plunger 24. In other words, during initial operation of the motor 28 the lead screw 34 may be allowed to rotate according to rotation of the spur gear 32 to extend the plunger 24 at the second faster speed along the spur gear 32. For example, the biasing resistance of the collar 38 may be configured to only preclude rotation of the lead screw 34 in the recessed position when external resistance or force applied to the plunger 24 is greater than a threshold resistance (e.g., when ice is present at the handle portion, increasing the force necessary to translate the plunger). Thus, when external force applied to the plunger is less than the threshold resistance (e.g., when ice is not present at the handle portion and the handle portion is free to move from the recessed position), the lead screw 34 rotates according to rotation of the spur gear 32 to more quickly extend the plunger and therefore more quickly move the handle portion to the graspable position. The variable speed and variable torque actuator may utilize characteristics of the actuators described in U.S. Publication No. US-2022-0341226, incorporated above.

When the handle portion 16 is pivoted from its non-use or recessed position to its graspable position via electrical operation of the actuator 20, the handle portion 16 is pivoted relative to the base portion 14 to at least partially extend the handle portion 14 from the base portion 14 and the door panel to be exposed and graspable by the user at the side of the door.

Referring to FIGS. 9-13, a door handle assembly 110 includes a base portion or bracket 114 configured to be attached or mounted at a side of a door of a vehicle and a handle portion 116 that moves laterally out from the base portion 114 at the side of the vehicle door when moved from the recessed position toward the extended or graspable position. When the handle portion 116 is in the recessed position, the handle portion 116 is disposed within a cavity or recess or channel of the base portion 114 with an outer surface or cover element 116*a* flush with or slightly extended from or recessed in the outer surface of the vehicle door. A variable speed actuator 120 is electrically operable to extend and retract a plunger that, when extended and retracted, imparts movement of the handle portion 116 between the recessed position and the extended position. When the handle portion 116 is in the recessed position (FIG. 10) and the actuator 120 is operated to extend the plunger, the handle portion 116 moves laterally away from the base portion 114 and the side of the vehicle toward the extended position (FIG. 11) so as to be graspable by a user to actuate the latch mechanism and open the door.

The door handle assembly 110 includes a sliding component or element 140 that moves along the outer surface of the base portion 114 according to movement of the plunger of the actuator 120. As the plunger extends from the actuator housing, the plunger engages the sliding element 140 and the sliding element 140 moves along the base portion 114 in a first direction parallel to movement of the plunger and, as the plunger retracts, the sliding element 140 moves in a second direction along the base portion 114 opposite the first direction. The base portion 114 is fixed at the vehicle door, such as via fasteners at the end of the base portion 114 that extends beyond the sliding element 140 and/or via fasteners that extend through openings in the sliding element 140 (with the openings being sufficiently large enough in the longitudinal direction to allow for sliding movement of the sliding element relative to the base portion without interference with the fasteners).

Figure 11:
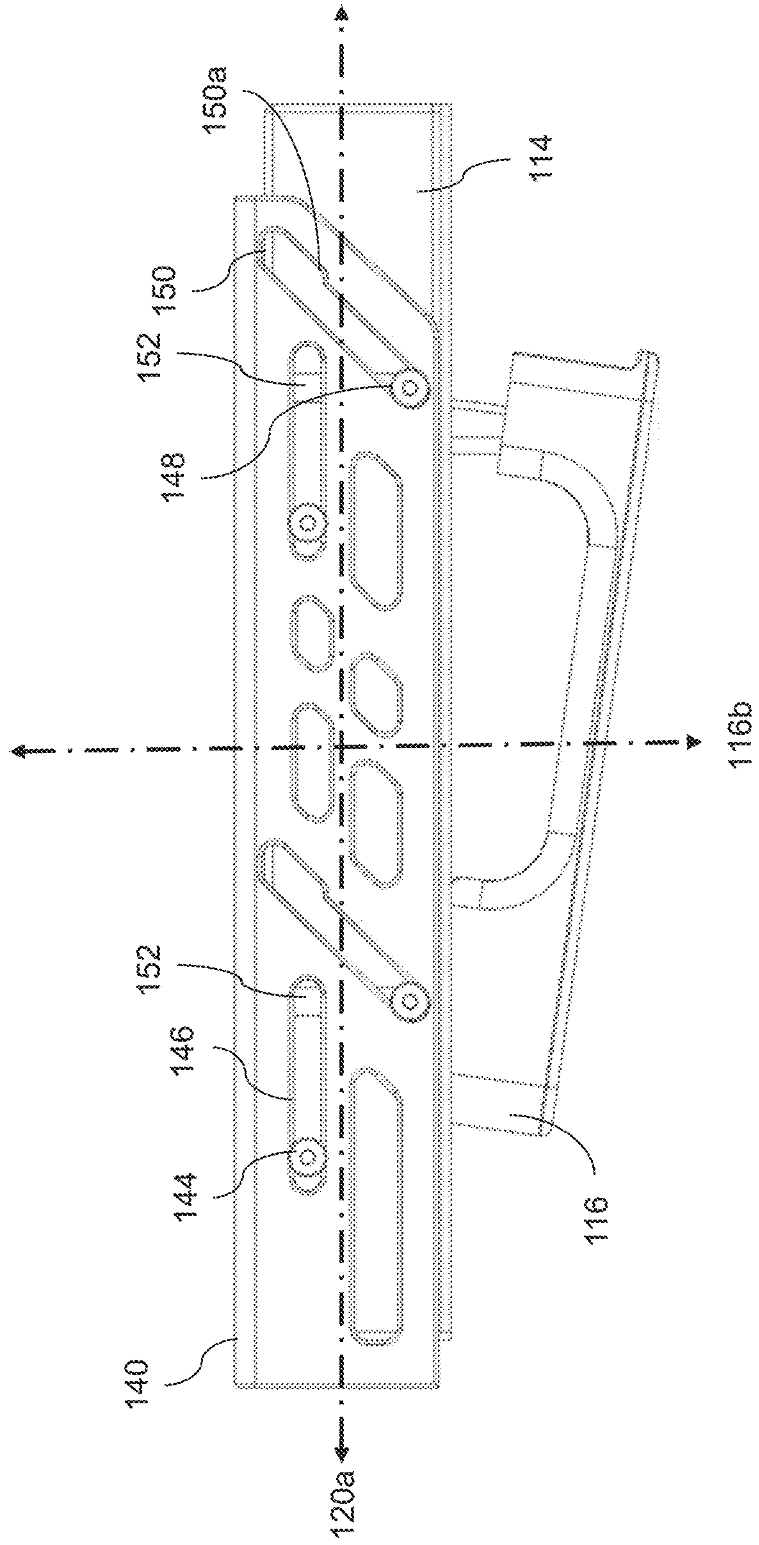
FIG. 11 is a perspective view of the handle portion of the door handle assembly of FIG. 9, where a sliding element is moved along the base portion to extend the handle portion from the base portion.
Figure 12:
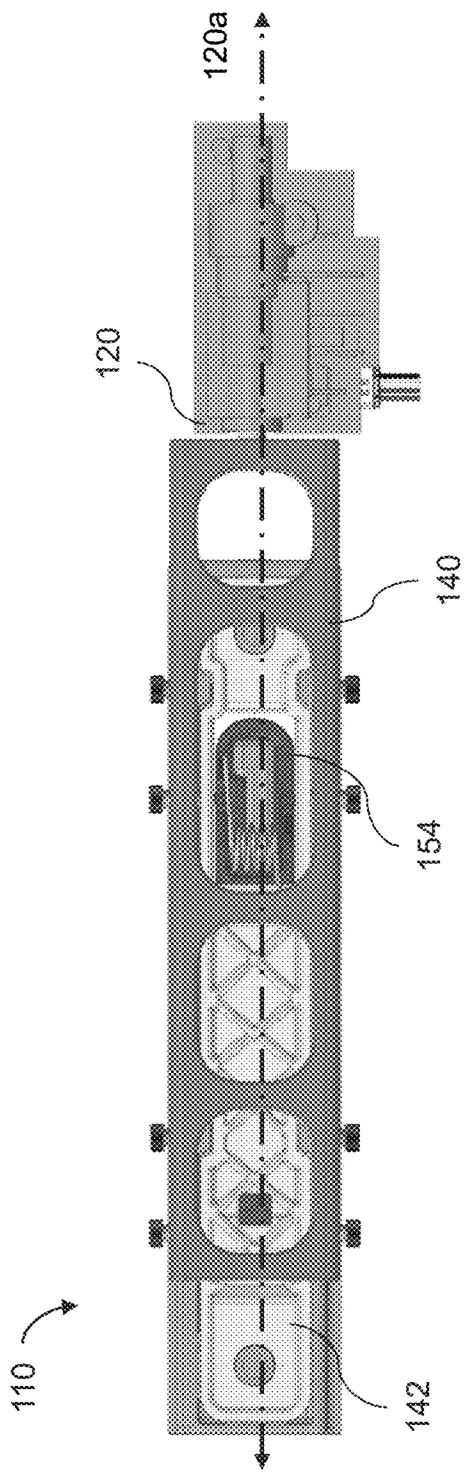
FIG. 12 is a perspective view of the door handle assembly of FIG. 9.

The handle portion 116 is connected at a handle pull bracket 142 within the channel of the base portion 114 and the handle pull bracket 142 is fixed relative to the base portion 114 in the direction of movement of the sliding element 140 (i.e., the handle pull bracket does not move longitudinally when the sliding element 140 is moved via the actuator). The handle portion 116 is movable relative to the base portion 114 and handle pull bracket 142 according to movement of the sliding element 140. Thus, instead of imparting pivotal movement to move the handle portion, the actuator 120 imparts movement of the sliding element 140 along the longitudinal axis of the plunger to move the handle portion 116. As shown in FIG. 11, the actuator 120 moves the sliding element 140 relative to the base portion 114 along a first or longitudinal axis 120*a* (that corresponds to movement of the plunger of the actuator 120) to move the handle portion 116 along a second or lateral axis 116*b*.

As the sliding element 140 moves along the outer surface of the base portion 114, respective sets of pins travel along guides or channels of the sliding element 140 to guide movement of the handle portion 116 responsive to movement of the sliding element 140. A first set of pins 144 (e.g., four pins, including two pins at each side of the assembly) are fixed relative to the base portion 114 and handle pull bracket 142 and are disposed in respective first channels 146 of the sliding element 140 that extend along the sliding element 140 parallel to the longitudinal axis 120*a*. Thus, as the sliding element 140 moves relative to the base portion 114 and the fixed first set of pins 144 move along the first channels 146, the first set of pins 144 guide movement of the sliding element 140 along the outer surface of the base portion 114 and parallel to the movement of the plunger of the actuator 120.

A second set of pins 148 (e.g., four pins, including two pins at each side of the assembly) are fixed relative to the handle portion 116 and are disposed in respective second channels 150 of the sliding element 140 and the second set of pins 148 are disposed in respective channels 152 formed in the base portion 114. Thus, as the sliding element 140 and the handle portion 116 move relative to the base portion 114, the second set of pins 148 move along the second channels 150 of the sliding element 140 and the channels 152 of the base portion 114. The channels 152 of the base portion 114 may be parallel to the lateral axis 116*b* and the second channels 150 of the sliding element 140 may be slanted or at an oblique angle relative to the lateral axis 116*b* so that as the sliding element 140 moves along the longitudinal axis 120*a*, the second set of pins 148 (and therefore the handle portion 116) are moved along the lateral axis 116*b*. In other words, the channels 152 of the base portion 114 and the second channels 150 of the sliding element 140 are configured such that, as the sliding element 140 moves along the base portion 114 to move the handle portion 116 from the recessed position toward the extended position, the second set of pins 148 move along the diagonal channels 150 and are forced or guided along the channels 152 of the base portion 114 to extend the handle portion 116 (with the handle portion only moving laterally outward or inward and not moving longitudinally along the base portion or sliding element). Thus, for example, when the handle portion 116 is in the recessed position, a first side or region of the diagonal second channels 150 aligns with a first or inner region of the base portion channels 152 and, when the handle portion 116 is in the extended position, a second side or region of the diagonal second channels 150 aligns with a second or outer region of the base portion channels 152.

Optionally, the second channels 150 of the sliding element 140 may include a lip or tab or stepped region 150*a* to engage the second set of pins 148 to secure the handle portion 116 at the recessed position and prevent inadvertent extension of the handle portion 116. For example, with the handle portion 116 in the recessed position, the second set of pins 148 may sit on or engage the stepped region 150 and the second set of pins 148 may only travel over the stepped regions 150*a* when the external force of the actuator 120 is moving the sliding element 140, causing the second set of pins 148 to travel along a smooth side of the channels 150 instead of the side of the channels 150 having the stepped region 150*a*. That is, movement of the sliding element 140 urges the second set of pins 148 away from the stepped region 150*a* and toward the smooth side of the channels 150 to promote further movement of the handle portion 116 from the recessed position. Absent the movement of the sliding element 140, the second set of pins 148 engage the stepped region 150*a* and lateral movement of the handle portion 116 from the recessed position is limited or precluded.

Figure 13:
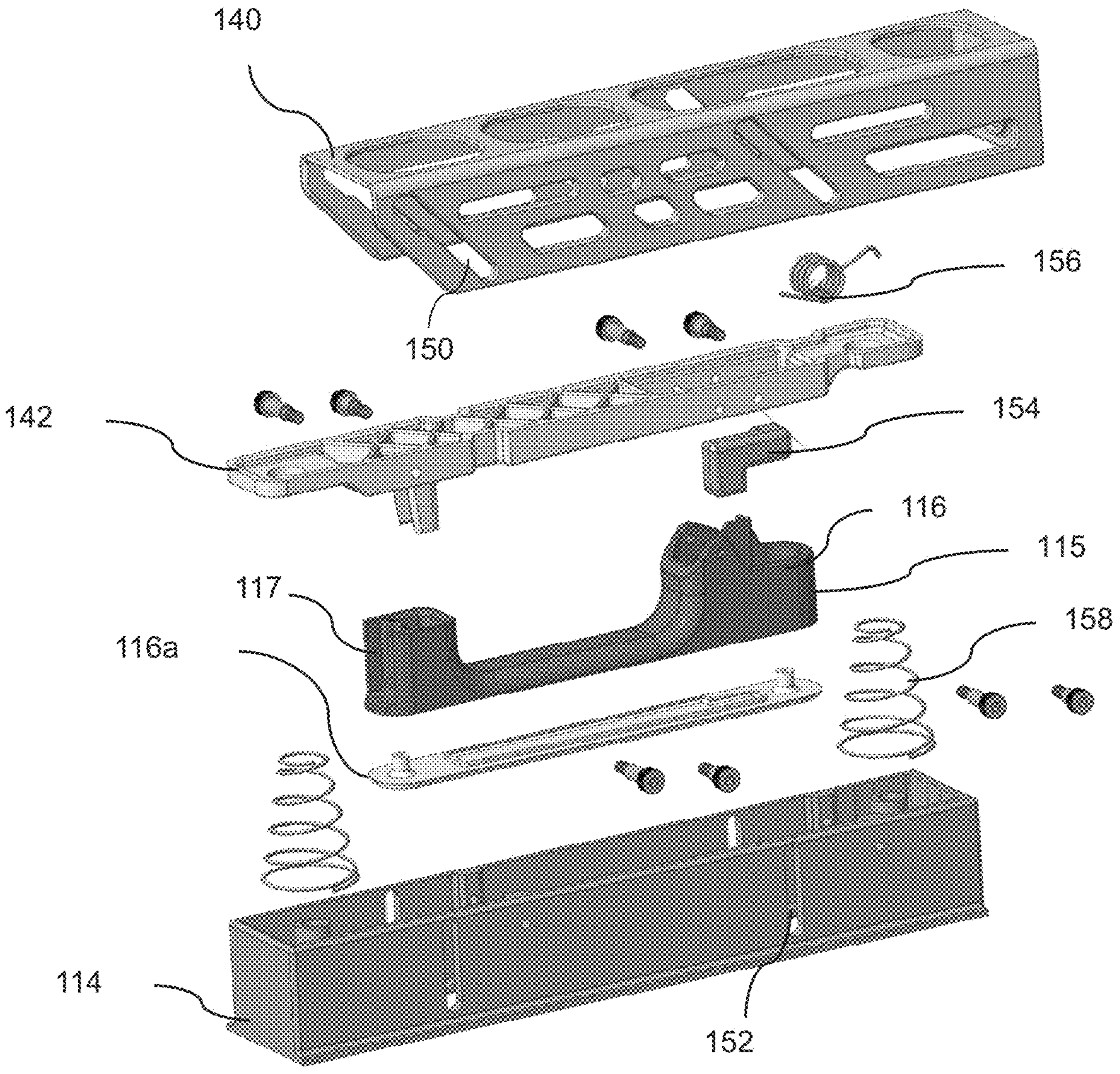
FIG. 13 is an exploded view of the door handle assembly of FIG. 9.

Movement of the second set of pins 148 and the handle portion 116 along the lateral axis 116*b* may extend the handle portion 116 relative to the handle pull bracket 142 to expose the handle portion 116 for grasping by a user. When a user grasps and pulls the handle portion 116, the handle portion 116 may pivot relative to the handle pull bracket 142 to actuate the latch mechanism and open the vehicle door (FIG. 11). For example, the handle portion 116 may pivotally connect at a first or pivot end 115 to the handle pull bracket 142, and a biasing element, such as a torsion spring 156, may be disposed at the pivot end 115 to bias or urge and return the handle portion 116 toward and to a nominal position relative to the handle pull bracket 142 after the handle is pulled and then released by the user (FIG. 13). The opposite end 117 of the handle portion (the end that is pulled outward by the user, with the handle portion pivoting at the pivot end) is connected to a latch mechanism of the door, such as via a bellcrank (not shown) of the handle assembly that moves or pivots to pull at a cable or actuating element of the latch mechanism.

Optionally, a counterweight 154 may be disposed at the handle portion 116, such as at or near the pivot end 115 and within a cavity or recess of the handle portion 116. The counterweight 154 helps limit the handle portion 116 from moving outward from the base portion 114 unintentionally, such as when the door is closed or the vehicle is in a collision or responsive to any other substantial sideward acceleration of the door or handle assembly.

Optionally, the handle pull bracket 142 may move along the lateral axis 116*b* with the handle portion 116. That is, the handle pull bracket 142 may be movable along the lateral axis 116*b* relative to the base portion 114 and first set of pins 144, which are fixed along the lateral axis by the first channels 146. One or more biasing elements 158 (e.g., compression springs) may be disposed between the handle pull bracket 142 and the inner surface of the base portion 114 and outboard of the handle portion 116. The biasing elements 158 bias the handle pull bracket 142 and handle portion 116 toward the recessed position. Thus, when the actuator 120 extends the plunger, the handle pull bracket 142 and/or handle portion 116 compress the biasing elements 158. When the actuator 120 retracts the plunger from engagement with the sliding element 140 (such as in response to the latch mechanism of the door being released to open the door or in response to the door being locked), the biasing elements 158 impart a biasing force against the handle pull bracket 142 and along the lateral axis 116*b* to move the handle portion 116 toward the recessed position according to movement of the second set of pins 148 along the channels 152 of the base portion 114 and the second channels 150 of the sliding element 140.

Thus, the door handle assembly 110 provides a variable speed actuator 120 that imparts linear movement of a sliding element 140 to move the handle portion 116 between the recessed position and the extended or graspable position. The actuator 120 may directly engage the sliding element 140, which allows for removal of a return spring and reduces or eliminates the risk of a user pinching their hand between the returning handle and base portion because the actuator 120 has low force pull back. The actuator 120 also provides high ice breaking force via the variable speed/variable torque function.

Deployment of the handle portion 114 is controlled via the tracks or channels of the sliding element 140 and base portion 114. The ramped slots of the sliding element 140 and/or the base portion 114 may be any suitable configuration, such as to alter the force and deployment speed at the beginning or end of the range of motion of the handle portion 114. For example, the second channels 150 of the sliding element 140 could have a relatively steep slope at the recessed position so that a lesser amount of longitudinal movement of the sliding element 140 results in greater lateral movement of the handle portion 116 (and thus greater ice breaking force) from the recessed position.

Thus, the handle portion 116 may be deployed from the recessed position more rapidly and with greater ice breaking force. A relatively shallower slope of the second channels 150 of the sliding element 140 may provide a relatively lower amount of longitudinal movement of the handle portion 116. For example, the second channels 150 of the sliding element 140 may have a relatively shallow slope toward the extended position to avoid rapid closing of the handle portion 116 that could catch or pinch the user's hand. The slope of the ramps translate the longitudinal force of the actuator 120 to lateral force at the handle portion 116. Additionally, the movement of the handle portion 114 along the channels 152 allows for fully parallel deployment of the handle portion 116 and uniform deployment and retraction forces at opposite ends of the handle portion 114.

Furthermore, the handle assembly 110 provides a low depth profile within the vehicle door. The handle pull and handle portion deployment mechanisms are independent of each other with the handle pull fitting inside the handle itself. This reduces weight of the handle assembly (such as to 30 grams or less) and requires a lower amount of handle pull travel to achieve the required cable travel (e.g., 25 millimeters or greater) to actuate the latch mechanism.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly. Optionally, the door handle assembly may include a soft touch handle portion, such as utilizing the principles described in U.S. Pat. Nos. 6,349,450; 6,550,103 and/or 6,907,643, incorporated above.

Although shown and described as being a generally horizontally oriented handle portion that moves laterally from the side of the vehicle, it is envisioned that the handle of the extendable flush door handle assembly may be oriented in any manner. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle.

Optionally, the door handle assembly or module may include or may be associated with an antenna for receiving signals from or communicating with a remote device. For example, the antenna (such as, for example, an antenna of the types described in U.S. Pat. No. 6,977,619 and/or U.S. Publication No. US-2010-0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion configured to mount at a door of a vehicle equipped with the vehicular exterior door handle assembly;

a handle portion including a grasping portion;

wherein the base portion has (i) a longitudinal axis that extends along a length dimension of the base portion and (ii) a lateral axis that, with the base portion mounted at the door of the vehicle, extends laterally across the vehicle;

wherein the handle portion is movable along the lateral axis relative to the base portion between (i) a recessed position, where the grasping portion of the handle portion is recessed at the base portion and not graspable by a user, and (ii) a deployed position, where the grasping portion of the handle portion protrudes outward from the base portion and is graspable by the user;

an actuator, wherein the actuator comprises an electrically operable motor;

wherein the actuator is operable to move the handle portion between the recessed position and the deployed position;

wherein the actuator, when the electrically operable motor is electrically operated, imparts translational movement of a sliding element along the longitudinal axis relative to the base portion; and wherein, as the sliding element moves along the longitudinal axis relative to the base portion, the sliding element imparts movement of the handle portion along the lateral axis between the recessed position and the deployed position according to movement of the sliding element along the longitudinal axis.

2. The vehicular exterior door handle assembly of claim 1, wherein, as the handle portion moves between the recessed position and the deployed position, the handle portion does not move along the longitudinal axis relative to the base portion.

3. The vehicular exterior door handle assembly of claim 1, wherein, as the sliding element moves along the longitudinal axis relative to the base portion, the sliding element does not move along the lateral axis relative to the base portion.

4. The vehicular exterior door handle assembly of claim 1, wherein, as the handle portion moves between the recessed position and the deployed position, the handle portion moves along lateral guide structure of the base portion, and wherein the lateral guide structure limits movement of the handle portion along the longitudinal axis relative to the base portion.

5. The vehicular exterior door handle assembly of claim 4, wherein the sliding element comprises (i) longitudinal guide structure that limits movement of the sliding element along the lateral axis relative to the base portion as the sliding element moves along the longitudinal axis relative to the base portion and (ii) sloped guide structure that guides movement of the handle portion along the lateral guide structure of the base portion as the sliding element moves along the longitudinal axis relative to the base portion.

6. The vehicular exterior door handle assembly of claim 5, wherein the base portion includes a pin that is (i) disposed in the longitudinal guide structure of the sliding element and (ii) moves along the longitudinal guide structure as the sliding element moves along the longitudinal axis relative to the base portion.

7. The vehicular exterior door handle assembly of claim 5, wherein the handle portion includes a pin that is (i) disposed in the lateral guide structure of the base portion, (ii) disposed in the sloped guide structure of the sliding element and (iii) moves along the lateral guide structure and the sloped guide structure as the handle portion moves along the lateral axis relative to the base portion.

8. The vehicular exterior door handle assembly of claim 1, wherein the actuator comprises a drive element coupled to an output element, and wherein the actuator, when the electrically operable motor is electrically operated, drives the drive element to impart translational movement of the output element, which imparts the translational movement of the sliding element.

9. The vehicular exterior door handle assembly of claim 8, wherein the drive element of the actuator comprises a variable speed drive element.

10. The vehicular exterior door handle assembly of claim 9, wherein, when the actuator is operated to move the handle portion from the recessed position toward a partially deployed position, the variable speed drive element imparts translational movement of the output element at a first speed until the handle portion is at the partially deployed position, and wherein, when the actuator is operated to further move the handle portion from the partially deployed position toward the deployed position, the variable speed drive element imparts translational movement of the output element at a second speed that is faster than the first speed to more rapidly move the handle portion from the partially deployed position toward the deployed position.

11. The vehicular exterior door handle assembly of claim 10, wherein the variable speed drive element comprises (i) a lower pitch gear element that engages an internal gear of a drive gear that, when the electrically operable motor is electrically operated, is rotatably driven by the electrically operable motor, and (ii) a higher pitch gear element that engages an internal gear of the output element.

12. The vehicular exterior door handle assembly of claim 11, wherein, when the actuator is operated to move the handle portion from the recessed position, the drive gear is rotatably driven to translationally move the variable speed drive element and the output element together and in tandem at the first speed and to move the handle portion toward the partially deployed position.

13. The vehicular exterior door handle assembly of claim 12, wherein rotation of the drive gear translationally moves the variable speed drive element via rotation of the internal gear of the drive gear about the lower pitch gear element.

14. The vehicular exterior door handle assembly of claim 10, wherein, when the actuator is operated to move the handle portion from the recessed position, and responsive to resistance to movement of the handle portion from the recessed position being less than or equal to a threshold resistance, the variable speed drive element imparts translational movement of the output element at the second speed and does not impart movement of the output element at the first speed when moving the handle portion from the recessed position toward the partially deployed position.

15. The vehicular exterior door handle assembly of claim 14, wherein, when the actuator is operated to move the handle portion from the recessed position, and responsive to resistance to movement of the handle portion from the recessed position being above the threshold resistance, the variable speed drive element imparts translational movement of the output element at the first speed when moving the handle portion from the recessed position toward the partially deployed position.

16. The vehicular exterior door handle assembly of claim 1, wherein the longitudinal axis is perpendicular relative to the lateral axis.

17. The vehicular exterior door handle assembly of claim 1, wherein the grasping portion of the handle portion is pivotable relative to a handle pull bracket, and wherein, with the handle portion in the deployed position, and responsive to the grasping portion being grasped by the user and manually moved further beyond the deployed position, the grasping portion pivots relative to the handle pull bracket to release a latch mechanism of the door to open the door.

18. The vehicular exterior door handle assembly of claim 17, wherein the handle pull bracket does not move along the lateral axis relative to the base portion.

19. The vehicular exterior door handle assembly of claim 17, wherein the handle pull bracket is movable with the handle portion along the lateral axis relative to the base portion.

20. The vehicular exterior door handle assembly of claim 19, wherein a biasing element is disposed between the handle pull bracket and the base portion, and wherein the biasing element biases the handle pull bracket and the handle portion toward the recessed position, and wherein, when the electrically operable motor is electrically operated to move the handle portion from the deployed position toward the recessed position, the biasing element urges the sliding element along the longitudinal axis relative to the base portion.

21. The vehicular exterior door handle assembly of claim 1, wherein the actuator is operated to move the handle portion between the recessed position and the deployed position in response to an input signal.

22. The vehicular exterior door handle assembly of claim 21, wherein a passive entry system associated with the vehicle provides the input signal.

23. A vehicular exterior door handle assembly, the vehicular exterior door handle assembly comprising:

- a base portion configured to mount at a door of a vehicle equipped with the vehicular exterior door handle assembly;
- a handle portion including a grasping portion;
- wherein the base portion has (i) a longitudinal axis that extends along a length dimension of the base portion and (ii) a lateral axis that, with the base portion mounted at the door of the vehicle, extends laterally across the vehicle;
- wherein the handle portion is movable along the lateral axis relative to the base portion between (i) a recessed position, where the grasping portion of the handle portion is recessed at the base portion and not graspable by a user, and (ii) a deployed position, where the grasping portion of the handle portion protrudes outward from the base portion and is graspable by the user;
- an actuator, wherein the actuator comprises (i) an electrically operable motor, (ii) an output element and (iii) a variable speed drive element coupled to the output element;

wherein the actuator is operable to move the handle portion between the recessed position and the deployed position;

wherein the actuator, when the electrically operable motor is electrically operated, drives the variable speed drive element to impart translational movement of the output element, and wherein, as the output element translationally moves, the output element imparts translational movement of a sliding element along the longitudinal axis relative to the base portion;

wherein, as the sliding element moves along the longitudinal axis relative to the base portion, the sliding element imparts movement of the handle portion along the lateral axis between the recessed position and the deployed position according to movement of the sliding element along the longitudinal axis;

wherein the actuator is operated to move the handle portion between the recessed position and the deployed position in response to an input signal from a passive entry system associated with the vehicle; and wherein, when the actuator is operated to move the handle portion from the recessed position toward a partially deployed position, the variable speed drive element imparts translational movement of the output element at a first speed until the handle portion is at the partially deployed position, and wherein, when the actuator is operated to further move the handle portion from the partially deployed position toward the deployed position, the variable speed drive element imparts translational movement of the output element at a second speed that is faster than the first speed to more rapidly move the handle portion from the partially deployed position toward the deployed position.

24. The vehicular exterior door handle assembly of claim 23, wherein, as the handle portion moves between the recessed position and the deployed position, the handle portion does not move along the longitudinal axis relative to the base portion.

25. The vehicular exterior door handle assembly of claim 23, wherein, as the sliding element moves along the longitudinal axis relative to the base portion, the sliding element does not move along the lateral axis relative to the base portion.

26. The vehicular exterior door handle assembly of claim 23, wherein the variable speed drive element comprises (i) a lower pitch gear element that engages an internal gear of a drive gear that, when the electrically operable motor is electrically operated, is rotatably driven by the electrically operable motor, and (ii) a higher pitch gear element that engages an internal gear of the output element.

27. The vehicular exterior door handle assembly of claim 26, wherein, when the actuator is operated to move the handle portion from the recessed position, the drive gear is rotatably driven to translationally move the variable speed drive element and the output element together and in tandem at the first speed and to move the handle portion toward the partially deployed position.

28. The vehicular exterior door handle assembly of claim 27, wherein rotation of the drive gear translationally moves the variable speed drive element via rotation of the internal gear of the drive gear about the lower pitch gear element.

29. The vehicular exterior door handle assembly of claim 23, wherein, when the actuator is operated to move the handle portion from the recessed position, and responsive to resistance to movement of the handle portion from the recessed position being less than or equal to a threshold resistance, the variable speed drive element imparts translational movement of the output element at the second speed and does not impart movement of the output element at the first speed when moving the handle portion from the recessed position toward the partially deployed position.

30. A vehicular exterior door handle assembly, the vehicular exterior door handle assembly comprising:

a base portion configured to mount at a door of a vehicle equipped with the vehicular exterior door handle assembly;

a handle portion including a grasping portion;

wherein the base portion has (i) a longitudinal axis that extends along a length dimension of the base portion and (ii) a lateral axis that, with the base portion mounted at the door of the vehicle, extends laterally across the vehicle;

wherein the handle portion is movable along the lateral axis relative to the base portion between (i) a recessed position, where the grasping portion of the handle portion is recessed at the base portion and not graspable by a user, and (ii) a deployed position, where the grasping portion of the handle portion protrudes outward from the base portion and is graspable by the user;

an actuator, wherein the actuator comprises an electrically operable motor;

wherein the actuator is operable to move the handle portion between the recessed position and the deployed position;

wherein the actuator, when the electrically operable motor is electrically operated, imparts translational movement of a sliding element along the longitudinal axis relative to the base portion;

wherein, as the sliding element moves along the longitudinal axis relative to the base portion, the sliding element imparts movement of the handle portion along the lateral axis between the recessed position and the deployed position according to movement of the sliding element along the longitudinal axis;

wherein, as the handle portion moves between the recessed position and the deployed position, the handle portion moves along lateral guide structure of the base portion, and wherein the lateral guide structure limits movement of the handle portion along the longitudinal axis relative to the base portion;

wherein the sliding element comprises (i) longitudinal guide structure that limits movement of the sliding element along the lateral axis relative to the base portion as the sliding element moves along the longitudinal axis relative to the base portion and (ii) sloped guide structure that guides movement of the handle portion along the lateral guide structure of the base portion as the sliding element moves along the longitudinal axis relative to the base portion; and wherein the grasping portion of the handle portion is pivotable relative to a handle pull bracket, and wherein, with the handle portion in the deployed position, and responsive to the grasping portion being grasped by the user and manually moved further beyond the deployed position, the grasping portion pivots relative to the handle pull bracket to release a latch mechanism of the door to open the door.

31. The vehicular exterior door handle assembly of claim 30, wherein the base portion includes a pin that is (i) disposed in the longitudinal guide structure of the sliding element and (ii) moves along the longitudinal guide structure as the sliding element moves along the longitudinal axis relative to the base portion.

32. The vehicular exterior door handle assembly of claim 30, wherein the handle portion includes a pin that is (i) disposed in the lateral guide structure of the base portion, (ii) disposed in the sloped guide structure of the sliding element and (iii) moves along the lateral guide structure and the sloped guide structure as the handle portion moves along the lateral axis relative to the base portion.

33. The vehicular exterior door handle assembly of claim 30, wherein the handle pull bracket does not move along the lateral axis relative to the base portion.

34. The vehicular exterior door handle assembly of claim 30, wherein the handle pull bracket is movable with the handle portion along the lateral axis relative to the base portion.

35. The vehicular exterior door handle assembly of claim 34, wherein a biasing element is disposed between the handle pull bracket and the base portion, and wherein the biasing element biases the handle pull bracket and the handle portion toward the recessed position, and wherein, when the electrically operable motor is electrically operated to move the handle portion from the deployed position toward the recessed position, the biasing element urges the sliding element along the longitudinal axis relative to the base portion.

* * * * *